(12) United States Patent
Yamada

(10) Patent No.: US 12,132,355 B2
(45) Date of Patent: Oct. 29, 2024

(54) ROTOR AND MOTOR

(71) Applicant: Nidec Corporation, Kyoto (JP)

(72) Inventor: Yukie Yamada, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 248 days.

(21) Appl. No.: 17/800,079

(22) PCT Filed: Sep. 14, 2020

(86) PCT No.: PCT/JP2020/034772
§ 371 (c)(1),
(2) Date: Aug. 16, 2022

(87) PCT Pub. No.: WO2021/171663
PCT Pub. Date: Sep. 2, 2021

(65) Prior Publication Data
US 2023/0100335 A1  Mar. 30, 2023

(30) Foreign Application Priority Data

Feb. 27, 2020 (JP) ................................ 2020-031830

(51) Int. Cl.
*H02K 1/27* (2022.01)
*H02K 1/276* (2022.01)
*H02K 1/28* (2006.01)

(52) U.S. Cl.
CPC ............ *H02K 1/2766* (2013.01); *H02K 1/28* (2013.01); *H02K 2213/03* (2013.01)

(58) Field of Classification Search
CPC ..... H02K 1/2766; H02K 1/28; H02K 2213/03
See application file for complete search history.

(56) References Cited

U.S. PATENT DOCUMENTS

| | | | |
|---|---|---|---|
| 2015/0303749 A1* | 10/2015 | Okubo | H02K 21/14 310/156.38 |
| 2018/0269734 A1* | 9/2018 | Soma | H02K 21/14 |

OTHER PUBLICATIONS

Official Communication issued in International Patent Application No. PCT/JP2020/034772, mailed on Nov. 17, 2020.

* cited by examiner

*Primary Examiner* — Thomas Truong
(74) *Attorney, Agent, or Firm* — Keating & Bennett, LLP

(57) ABSTRACT

A rotor includes a rotor core including a first slit, a second slit radially inward of the first slit, and a third slit radially inward of the second slit, a first magnet in the first slit, a second magnet in the second slit, and a third magnet in the third slit. A first angle defined by a line segment connecting a reference point and the end portion of the first slit and a line segment connecting the reference point and the end portion of the first magnet is larger than a second angle defined by a line segment connecting the reference point and the end portion of the second slit and a line segment connecting the reference point and the end portion of the second magnet.

9 Claims, 4 Drawing Sheets

ROTOR AND MOTOR

CROSS-REFERENCE TO RELATED APPLICATIONS

This is a U.S. national stage of application No. PCT/JP2020/034772, filed on Sep. 14, 2020, and with priority under 35 U.S.C. § 119(a) and 35 U.S.C. § 365(b) being claimed from Japanese Patent Application No. 2020-031830, filed on Feb. 27, 2020, the entire disclosures of which are hereby incorporated herein by reference.

FIELD OF THE INVENTION

The present disclosure relates to a rotor and a motor.

BACKGROUND

A rotor of a rotary electric machine including a rotor core and a permanent magnet disposed in a hole provided in the rotor core is known. For example, there is known a rotor including a permanent magnet in which a radial cross section has an arc shape, and a surface curved in a convex shape is provided to face the rotation axis side of the rotor.

In the conventional rotor, a part of the magnetic force of the permanent magnet may not be used to generate the torque of the motor because a part of the magnetic force of the permanent magnet circulates in the rotor and does not flow between the stator and the rotor. Therefore, the torque of the motor may not be sufficiently improved.

SUMMARY

A rotor according to an example embodiment of the present disclosure is provided in a motor and is rotatable about a center axis. The rotor includes a rotor core including a plurality of slits, and a plurality of magnets provided in the plurality of slits. The plurality of slits includes an arc-shaped first slit that is convex radially inward as viewed in an axial direction, an arc-shaped second slit that is separately located radially inward of the first slit and is convex radially inward as viewed in an axial direction, and an arc-shaped third slit that is separately located radially inward of the second slit and is convex radially inward as viewed in an axial direction. The plurality of magnets include an arc-shaped first magnet that is provided in the first slit and extends along the first slit when viewed in the axial direction, an arc-shaped second magnet that is provided in the second slit and extends along the second slit when viewed in the axial direction, and an arc-shaped third magnet that is provided in the third slit and extends along the third slit when viewed in the axial direction. Two end portions of the first magnet are separated from two end portions of the first slit when viewed in the axial direction. Two end portions of the second magnet are separated from two end portions of the second slit as viewed in the axial direction. Two end portions of the third magnet are separated from two end portions of the third slit as viewed in the axial direction. When a point at which an imaginary line passing through the center axis, the first slit, the second slit, and the third slit intersects an outer peripheral surface of the rotor core is set as a reference point and viewed in the axial direction, a first angle defined by a line segment connecting the reference point and an end portion of the first slit and a line segment connecting the reference point and an end portion of the first magnet is larger than a second angle defined by a line segment connecting the reference point and an end portion of the second slit and a line segment connecting the reference point and an end portion of the second magnet as viewed in the axial direction. The second angle is larger than a third angle defined by a line segment connecting the reference point and an end portion of the third slit and a line segment connecting the reference point and an end portion of the third magnet as viewed in the axial direction.

A motor according to an example embodiment of the present disclosure is a motor including the rotor described above and a stator located radially outside the rotor.

The above and other elements, features, steps, characteristics and advantages of the present disclosure will become more apparent from the following detailed description of the example embodiments with reference to the attached drawings.

DETAILED DESCRIPTION

A Z-axis direction appropriately illustrated in each drawing is a vertical direction in which a positive side is an "upper side" and a negative side is a "lower side". A center axis J appropriately illustrated in each drawing is an imaginary line that is parallel to the Z-axis direction and extends in the vertical direction. In the following description, an axial direction of the center axis J, that is, a direction parallel to the up-and-down direction will be simply referred to as the "axial direction", a radial direction having its center on the center axis J will be simply referred to as the "radial direction", and a circumferential direction having its center on the center axis J will be simply referred to as the "circumferential direction".

The vertical direction, the upper side, and the lower side are merely terms for describing a relative positional relationship between the respective units, and an actual layout relationship and the like may be other than the layout relationship represented by these terms.

Figure 1:
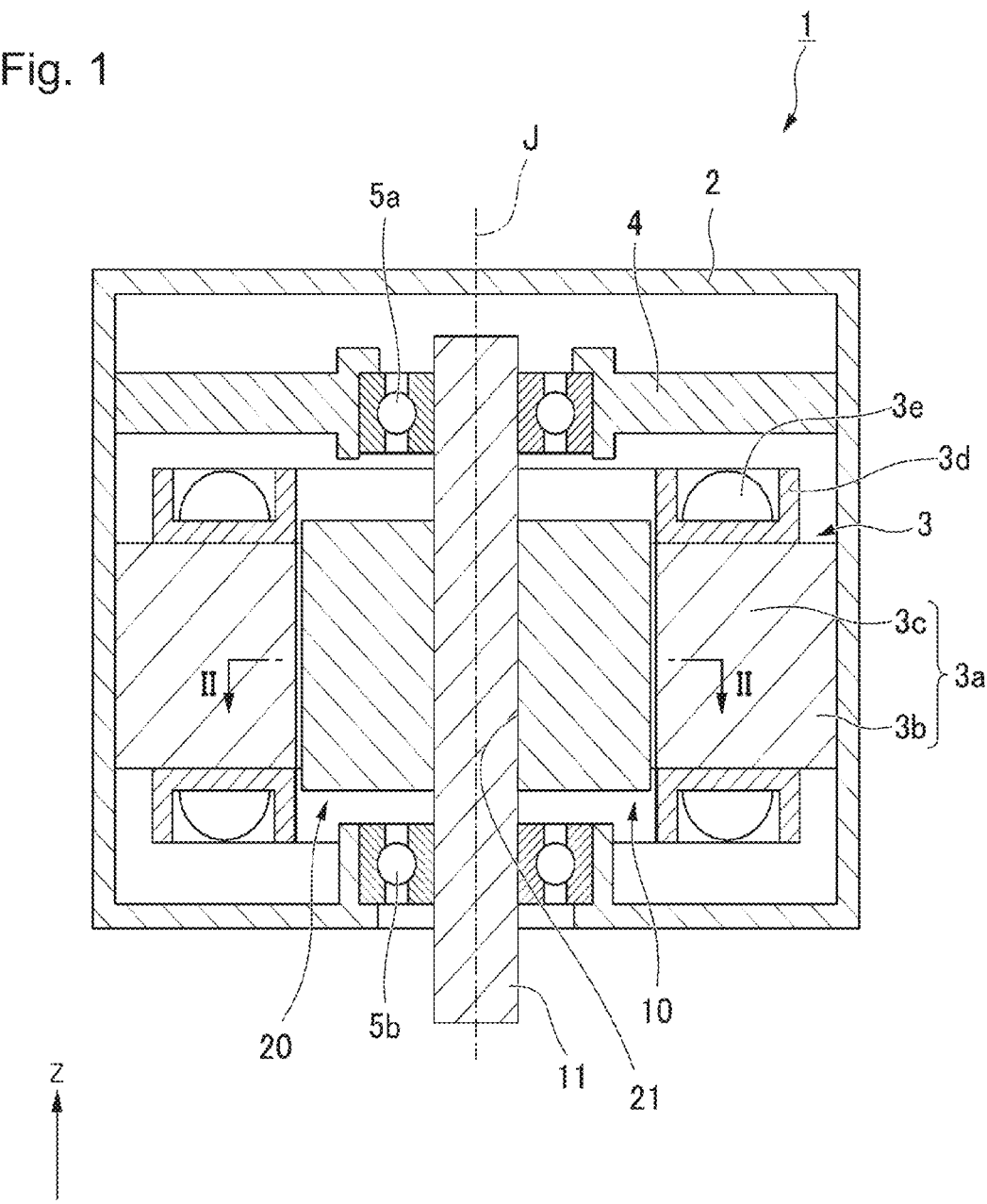
FIG. 1 is a cross-sectional view schematically illustrating a motor according to an example embodiment of the present disclosure.

A motor 1 of the present example embodiment illustrated in FIG. 1 is an inner rotor type motor. As illustrated in FIG. 1, a motor 1 of the present example embodiment includes a housing 2, a rotor 10, a stator 3, a bearing holder 4, and bearings 5a and 5b. The housing 2 accommodates therein the rotor 10, the stator 3, the bearing holder 4, and the bearings 5a and 5b. The bottom part of the housing 2 holds the bearing 5b. The bearing holder 4 holds the bearing 5a. For example, each of the bearings 5a and 5b is a ball bearing.

The stator 3 is located radially outside the rotor 10. The stator 3 includes a stator core 3a, an insulator 3d, and a plurality of coils 3e. The stator core 3a includes a core back 3b and a plurality of teeth 3c. The core back 3b has an annular shape centered on a center axis J. The plurality of teeth 3c extend radially inward from the core back 3b. Although not illustrated, the plurality of teeth 3c are disposed at equal intervals over the entire circumference along the circumferential direction. The plurality of coils 3e is attached to the stator core 3a via the insulator 3d.

Figure 2:
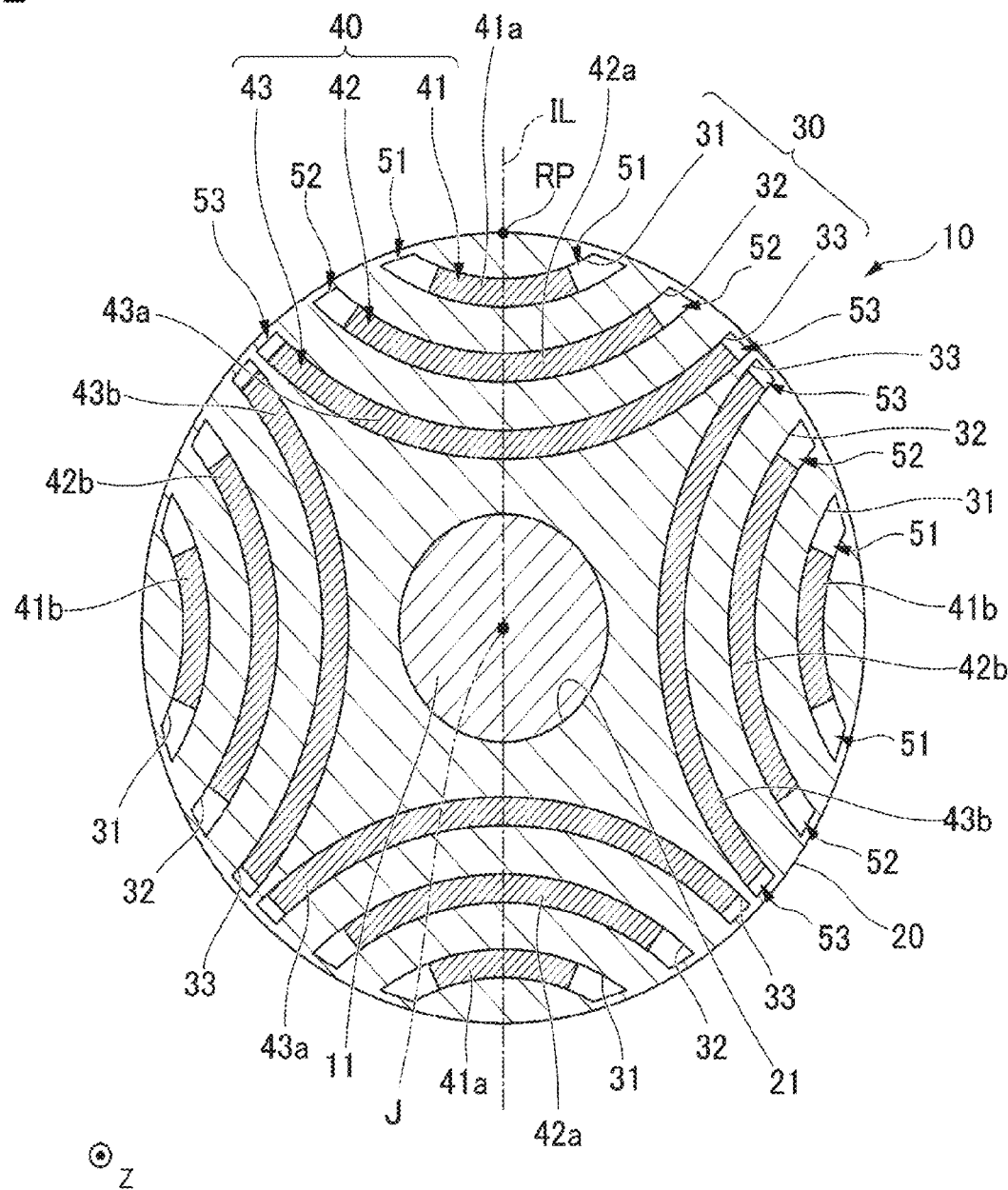
FIG. 2 is a cross-sectional view illustrating a rotor of an example embodiment of the present disclosure, and is a cross-sectional view taken along II-II in FIG. 1.

The rotor 10 is rotatable about the center axis J. As illustrated in FIG. 2, the rotor 10 includes a shaft 11, a rotor core 20, and a plurality of magnets 40. The shaft 11 has a columnar shape that extends in the axial direction about the center axis J. As illustrated in FIG. 1, the shaft 11 is rotatably supported about the center axis J by the bearings 5a and 5b.

The rotor core 20 is a magnetic material. The rotor core 20 is fixed to an outer peripheral surface of the shaft 11. The rotor core 20 has a through hole 21 that penetrates the rotor core 20 in the axial direction. As illustrated in FIG. 2, the through hole 21 has a circular shape centered on the center axis J as viewed in the axial direction. The shaft 11 passes through the through hole 21. The shaft 11 is fixed inside the through hole 21 by press fitting, for example. Although illustration is omitted, the rotor core 20 is configured by, for example, a plurality of electromagnetic steel plates laminated in the axial direction.

The rotor core 20 has a plurality of slits 30. The plurality of slits 30 penetrates the rotor core 20 in the axial direction, for example. The plurality of slits 30 extend along a plane orthogonal to the axial direction. The plurality of slits 30 include a first slit 31, a second slit 32, and a third slit 33.

The first slit 31, the second slit 32, and the third slit 33 have an arc shape that is convex radially inward as viewed in the axial direction. The second slit 32 is located to be separated radially inward of the first slit 31. The third slit 33 is located to be separated radially inward of the second slit 32. In the present example embodiment, the first slit 31, the second slit 32, and the third slit 33 are disposed side by side at equal intervals in the radial direction. The first slit 31, the second slit 32, and the third slit 33 have, for example, an arc shape concentric with each other as viewed in the axial direction. The arc radius of the second slit 32 is larger than the arc radius of the first slit 31. The arc radius of the third slit 33 is larger than the arc radius of the second slit 32.

The width of the first slit 31, the width of the second slit 32, and the width of the third slit 33 are, for example, the same. In the present specification, "certain parameters are the same" includes not only a case where certain parameters are strictly the same as each other but also a case where certain parameters are substantially the same as each other. The expression, "the certain parameters are substantially the same as each other" includes, for example, a case where the certain parameters slightly deviate from each other within a tolerance range.

As viewed in the axial direction, the interval between the first slit 31 and the second slit 32 and the interval between the second slit 32 and the third slit 33 are larger than the width of each slit 30. The width of each slit 30 is a dimension of each slit 30 in a direction orthogonal to a direction in which each slit 30 extends in an arc shape as viewed in the axial direction.

In the following description, a direction in which the slit 30 extends in an arc shape as viewed in the axial direction is referred to as an "extending direction". A direction in which the first slit 31 extends in an arc shape as viewed in the axial direction is referred to as a "first extending direction". A direction in which the second slit 32 extends in an arc shape as viewed in the axial direction is referred to as a "second extending direction". A direction in which the third slit 33 extends in an arc shape as viewed in the axial direction is referred to as a "third extending direction".

In the present example embodiment, both end portions of the first slit 31, both end portions of the second slit 32, and both end portions of the third slit 33 are located at the radially outer edge of the rotor core 20. Both end portions of the first slit 31 are both end portions of the first slit 31 in the first extending direction. Both end portions of the second slit 32 are both end portions of the second slit 32 in the second extending direction. Both end portions of the third slit 33 are both end portions of the third slit 33 in the third extending direction. Both end portions of the first slit 31, both end portions of the second slit 32, and both end portions of the third slit 33 are located to be separated slightly radially inward from the outer peripheral surface of the rotor core 20, for example. The inner side surfaces in both end portions of each slit 30 are disposed along the outer peripheral surface of the rotor core 20 as viewed in the axial direction.

In the present example embodiment, the radial positions of both end portions of the first slit 31, the radial positions of both end portions of the second slit 32, and the radial positions of both end portions of the third slit 33 are the same.

Both end portions of the first slit 31, both end portions of the second slit 32, and both end portions of the third slit 33 are disposed side by side at intervals along the circumferential direction at the radially outer edge of the rotor core 20. As viewed in the axial direction, the dimension of the second slit 32 in the second extending direction is larger than the dimension of the first slit 31 in the first extending direction. As viewed in the axial direction, the dimension of the third slit 33 in the third extending direction is larger than the dimension of the second slit 32 in the second extending direction.

In the present example embodiment, four sets each including one first slit 31, one second slit 32, and one third slit 33 arranged at intervals in the radial direction are provided along the circumferential direction. Thus, in the present example embodiment, a plurality of first slits 31, a plurality of second slits 32, and a plurality of third slits 33 are provided along the circumferential direction. The plurality of first slits 31 are disposed at equal intervals over the entire circumference along the circumferential direction. The plurality of second slits 32 are disposed at equal intervals over the entire circumference along the circumferential direction. The plurality of third slits 33 are disposed at equal intervals over the entire circumference along the circumferential direction. Each set including one first slit 31, one second slit 32, and one third slit 33 disposed at intervals in the radial direction has the same configuration except that the sets adjacent to each other in the circumferential direction are disposed in a posture inclined by 90° in the circumferential direction.

The plurality of magnets 40 are provided in the plurality of slits 30. One magnet 40 is provided in each slit 30. In the present example embodiment, the magnet 40 is a ferrite magnet. The plurality of magnets 40 includes a first magnet 41, a second magnet 42, and a third magnet 43.

The first magnet 41 is provided in the first slit 31. In the present example embodiment, the first magnet 41 is provided for each of the first slits 31. For example, four first magnets 41 are provided. The first magnet 41 has an arc shape extending along the first slit 31 as viewed in the axial direction. The first magnet 41 has an arc shape protruding radially inward as viewed in the axial direction. The first magnet 41 is fitted into the first slit 31. Both side surfaces in the radial direction of the first magnet 41 are in contact with both side surfaces in the radial direction of the first slit 31.

As viewed in the axial direction, both end portions of the first magnet 41 are disposed to be separated from both end portions of the first slit 31. Both end portions of the first magnet 41 are both end portions of the first magnet 41 in the first extending direction. Both end surfaces of the first magnet 41 in the first extending direction are, for example, orthogonal to the first extending direction. First flux barrier portions 51 each are provided on both sides of the first magnet 41 in the first extending direction. The first flux barrier portion 51 is a portion of the first slit 31 where the first magnet 41 is not disposed. In the present example embodiment, the first flux barrier portion 51 is a void portion. Although not illustrated, the first magnet 41 is provided over the entire first slit 31 in the axial direction, for example.

The second magnet 42 is provided in the second slit 32. In the present example embodiment, the second magnet 42 is provided for each of the second slits 32. For example, four second magnets 42 are provided. The second magnet 42 has an arc shape extending along the second slit 32 as viewed in the axial direction. The second magnet 42 has an arc shape protruding radially inward as viewed in the axial direction. The second magnet 42 is fitted into the second slit 32. Both side surfaces in the radial direction of the second magnet 42 are in contact with both side surfaces in the radial direction of the second slit 32.

As viewed in the axial direction, both end portions of the second magnet 42 are disposed to be separated from both end portions of the second slit 32. Both end portions of the second magnet 42 are both end portions of the second magnet 42 in the second extending direction. Both end surfaces of the second magnet 42 in the second extending direction are, for example, orthogonal to the second extending direction. Second flux barrier portions 52 each are provided on both sides of the second magnet 42 in the second extending direction. The second flux barrier portion 52 is a portion of the second slit 32 where the second magnet 42 is not disposed. In the present example embodiment, the second flux barrier portion 52 is a void portion. The dimension of the second flux barrier portion 52 in the second extending direction is smaller than the dimension of the first flux barrier portion 51 in the first extending direction. Although not illustrated, the second magnet 42 is provided over the entire second slit 32 in the axial direction, for example.

The third magnet 43 is provided in the third slit 33. In the present example embodiment, the third magnet 43 is provided for each third slit 33. For example, four third magnets 43 are provided. The third magnet 43 has an arc shape extending along the third slit 33 as viewed in the axial direction. The third magnet 43 has an arc shape protruding radially inward as viewed in the axial direction. The third magnet 43 is fitted into the third slit 33. Both side surfaces in the radial direction of the third magnet 43 are in contact with both side surfaces in the radial direction of the third slit 33.

Both end portions of the third magnet 43 are disposed to be separated from both end portions of the third slit 33. Both end portions of the third magnet 43 are both end portions of the third magnet 43 in the third extending direction. Both end surfaces of the third magnet 43 in the third extending direction are, for example, orthogonal to the third extending direction. Third flux barrier portions 53 are provided on both sides of the third magnet 43 in the third extending direction. The third flux barrier portion 53 is a portion of the third slit 33 where the third magnet 43 is not disposed. In the present example embodiment, the third flux barrier portion 53 is a void portion. The dimension of the third flux barrier portion 53 in the third extending direction is smaller than the dimension of the second flux barrier portion 52 in the second extending direction. Although not illustrated, the third magnet 43 is provided over the entire inside of the third slit 33 in the axial direction, for example.

The magnetic pole of the first magnet 41, the magnetic pole of the second magnet 42, and the magnetic pole of the third magnet 43 are disposed along the radial direction. The first magnet 41 includes a first magnet 41a and a first magnet 41b in which magnetic poles are disposed to be radially inverted from each other. The first magnet 41a and the first magnet 41b are alternately disposed along the circumferential direction. The second magnet 42 includes a second magnet 42a and a second magnet 42b in which magnetic poles are disposed to be radially inverted from each other. The second magnet 42a and the second magnet 42b are alternately disposed along the circumferential direction. The third magnet 43 includes a third magnet 43a and a third magnet 43b in which magnetic poles are disposed to be radially inverted from each other. The third magnet 43a and the third magnet 43b are alternately disposed along the circumferential direction.

The first magnet 41a, the second magnet 42a, and the third magnet 43a are disposed in each slit of the same set among the sets each including the first slit 31, the second slit 32, and the third slit 33 disposed at intervals in the radial direction. As a result, the first magnet 41a, the second magnet 42a, and the third magnet 43a are disposed side by side at intervals in the radial direction.

The first magnet 41b, the second magnet 42b, and the third magnet 43b are disposed in each slit of the same set among the sets each including the first slit 31, the second slit 32, and the third slit 33 disposed at intervals in the radial direction. As a result, the first magnet 41b, the second magnet 42b, and the third magnet 43b are disposed side by side at intervals in the radial direction.

For example, in each of the first magnet 41a, the second magnet 42a, and the third magnet 43a, the radially outer portion is the N pole, and the radially inner portion is the S pole. For example, in each of the first magnet 41b, the second magnet 42b, and the third magnet 43b, the radially outer portion is the S pole, and the radially inner portion is the N pole. In each of the first magnet 41a, the second magnet 42a, and the third magnet 43a, the radially outer portion may be the S pole, the radially inner portion may be the N pole, and in each of the first magnet 41b, the second magnet 42b, and the third magnet 43b, the radially outer portion may be the N pole, and the radially inner portion may be the S pole.

Here, as viewed in the axial direction, a point at which an imaginary line IL passing through the center axis J, the first slit 31, the second slit 32, and the third slit 33 intersects the outer peripheral surface of the rotor core 20 is defined as a reference point RP. In the present example embodiment, the imaginary line IL passes through the center axis J, the circumferential center of the first slit 31, the circumferential center of the second slit 32, and the circumferential center of the third slit 33 as viewed in the axial direction. For example, the imaginary line IL also passes through the circumferential center of the first magnet 41, the circumferential center of the second magnet 42, and the circumferential center of the third magnet 43 as viewed in the axial direction.

Figure 3:
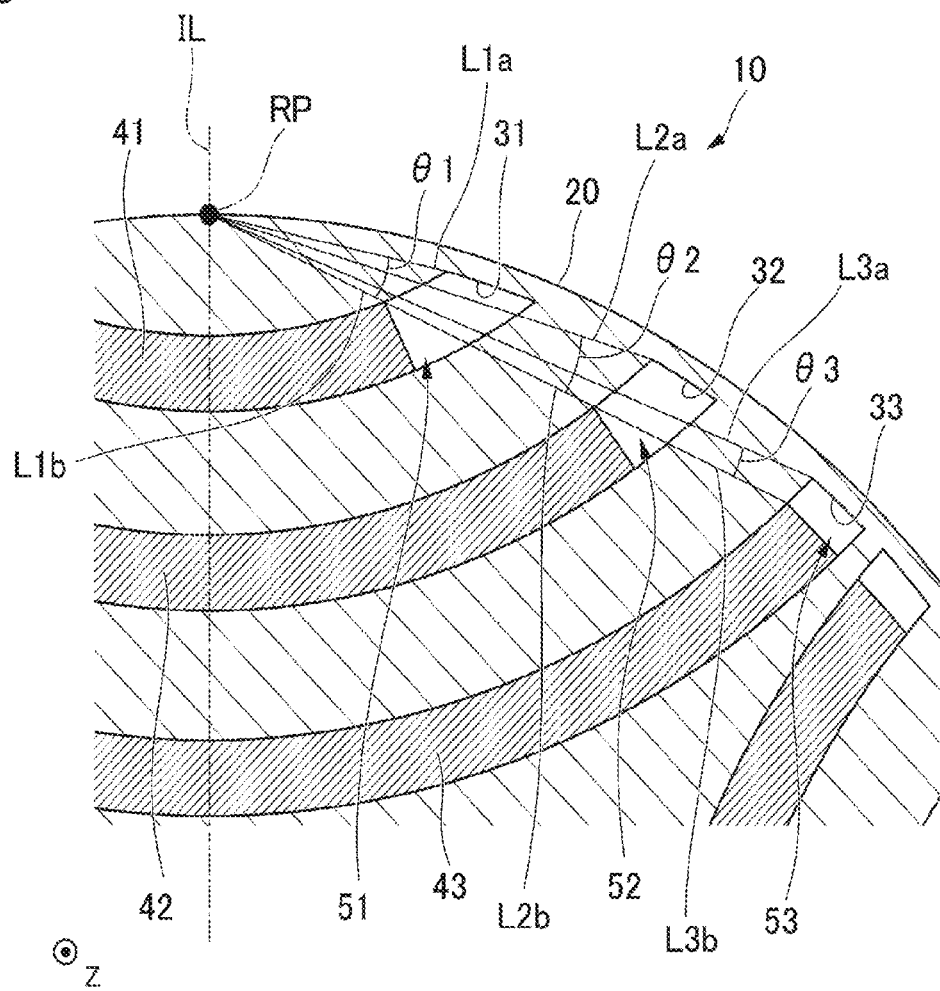
FIG. 3 is a cross-sectional view illustrating a portion of the rotor of an example embodiment of the present disclosure, and is a partially enlarged view of FIG. 2.

As illustrated in FIG. 3, as viewed in the axial direction, a first angle $\theta 1$ formed by a line segment L1a connecting the reference point RP and the end portion of the first slit 31 and a line segment L1b connecting the reference point RP and the end portion of the first magnet 41 is larger than a second angle $\theta 2$ formed by a line segment L2a connecting the reference point RP and the end portion of the second slit 32 and a line segment L2b connecting the reference point RP and the end portion of the second magnet 42. As viewed in the axial direction, the second angle θ2 is larger than a third angle θ3 formed by a line segment L3a connecting the reference point RP and the end portion of the third slit 33 and a line segment L3b connecting the reference point RP and the end portion of the third magnet 43. That is, the first angle θ1, the second angle θ2, and the third angle θ3 satisfy a relationship of θ1>θ2>θ3.

In FIG. 3, the line segment L1a connects the reference point RP and one end portion of the radially outer edge of the first slit 31 in the first extending direction as viewed in the axial direction. In FIG. 3, the line segment L1b connects the reference point RP and one end portion of the radially outer edge of the first magnet 41 in the first extending direction as viewed in the axial direction. In FIG. 3, the line segment L2a connects the reference point RP and one end portion of the radially outer edge of the second slit 32 in the second extending direction as viewed in the axial direction. In FIG. 3, the line segment L2b connects the reference point RP and one end portion of the radially outer edge of the second magnet 42 in the second extending direction as viewed in the axial direction. In FIG. 3, the line segment L3a connects the reference point RP and one end portion of the radially outer edge of the third slit 33 in the third extending direction as viewed in the axial direction. In FIG. 3, the line segment L3b connects the reference point RP and one end portion of the radially outer edge of the third magnet 43 in the third extending direction as viewed in the axial direction. The line segment L1b, the line segment L2b, and the line segment L3b are provided on the same straight line as viewed in the axial direction, for example.

In the present example embodiment, the first angle θ1 is larger than twice the third angle θ3 and smaller than three times the third angle θ3. In the present example embodiment, the second angle θ2 is larger than 1.5 times the third angle θ3 and smaller than 2.5 times the third angle θ3.

According to the present example embodiment, since the first angle θ1, the second angle θ2, and the third angle θ3 satisfy the above-described relationship, the torque of the motor 1 can be improved. The details will be described below. If the magnet 40 is not disposed in the slit 30, as indicated by an arrow FB in FIG. 4, the magnetic flux flowing in the rotor core 20 easily flows in an arc shape along between the plurality of slits 30. As a result, the magnetic flux can easily flow into the rotor core 20 along the flow of the magnetic flux between the stator 3 and the rotor 10. By providing the slit 30 and guiding the flow of the magnetic flux in the rotor core 20 in this manner, even in a state where the magnet 40 is not provided in the rotor 10, torque for rotating the rotor 10 can be generated by the magnetic flux radiated from the stator 3. In the following description, torque generated between the rotor core 20 and the stator 3 regardless of such a magnet 40 is referred to as reluctance torque.

When the magnet 40 is disposed in the slit 30 with respect to the rotor core 20 capable of generating the reluctance torque as described above, a torque for rotating the rotor 10 is also generated by the magnetic force of the magnet 40. In the following description, the torque generated in the rotor 10 by the magnetic force of the magnet 40 is referred to as magnet torque. In the present example embodiment, both the reluctance torque and the magnet torque are generated in the rotor 10. The total torque obtained by adding the reluctance torque and the magnet torque is the torque of the motor 1.

Figure 4:
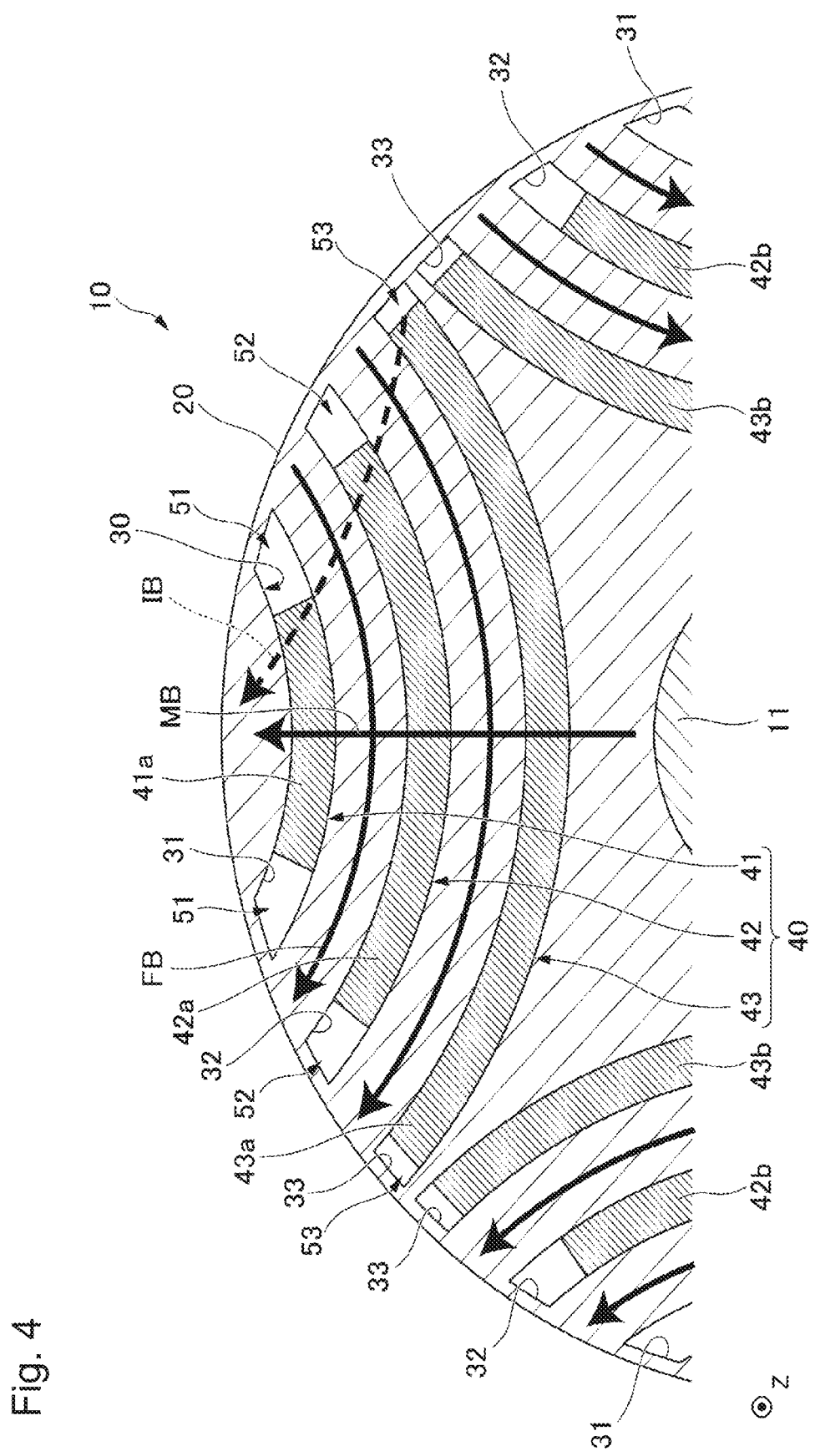
FIG. 4 is a cross-sectional view explaining a flow of magnetic flux in a rotor of an example embodiment of the present disclosure.

When power is not supplied to the stator 3, the magnetic flux radiated from the magnet 40 flows along the radial direction as indicated by an arrow MB in FIG. 4. When power is supplied to the stator 3, a flow of magnetic flux in which a flow of magnetic flux indicated by an arrow FB and a flow of magnetic flux indicated by an arrow MB in FIG. 4 are combined is generated in the rotor core 20.

Here, for example, a case where the magnet is disposed in the entire slit 30 will be considered. In this case, the magnetic flux radiated from both end portions of the magnet easily returns to both end portions of the magnet through the rotor core 20 without reaching the stator 3. Therefore, the magnetic flux of the magnet cannot be sufficiently used to improve the torque of the motor. The flow of the magnetic flux in other portions may be disturbed by the magnetic flux circulating between both end portions of the magnet and the rotor core 20. As a result, even if the magnet is simply disposed in the slit 30, the torque of the motor may not be sufficiently improved.

On the other hand, according to the present example embodiment, both end portions of each magnet 40 are disposed to be separated from both end portions of each slit 30. Therefore, flux barrier portions are provided on both sides of each magnet 40. More specifically, the first flux barrier portions 51 are provided on both sides of the first magnet 41 in the first extending direction. The second flux barrier portions 52 are provided on both sides of the second magnet 42 in the second extending direction. The third flux barrier portions 53 are provided on both sides of the third magnet 43 in the third extending direction. Thus, the magnetic flux radiated from both end portions of each magnet 40 is blocked by each flux barrier portion, and is prevented from returning to both end portions of each magnet 40. Therefore, the magnetic flux radiated from the magnet 40 can be sufficiently used to improve the torque of the motor 1. Since it is possible to suppress the generation of the magnetic flux circulating only between the magnet 40 and the rotor core 20, the flow of the magnetic flux in other portions can also be prevented from being disturbed.

However, there is a case where it is difficult to sufficiently use the magnetic flux radiated from the magnet 40 to generate the magnet torque simply by arranging the flux barrier portions on both sides in the extending direction of each magnet 40.

On the other hand, according to the present example embodiment, the first angle θ1 is larger than the second angle θ2, and the second angle θ2 is larger than the third angle θ3. Therefore, as viewed in the axial direction, the end portion of the first magnet 41 provided in the first slit 31 is easily disposed at a position farther separated from the outer peripheral surface of the rotor core 20 in the extending direction than the end portion of the second magnet 42 provided in the second slit 32. As viewed in the axial direction, the end portion of the second magnet 42 provided in the second slit 32 is easily disposed at a position farther separated from the outer peripheral surface of the rotor core 20 in the extending direction than the end portion of the third magnet 43 provided in the third slit 33. As a result, as indicated by a broken line arrow IB in FIG. 4, a flow of magnetic flux passing through one end portion of the first magnet 41 in the first extending direction, one end portion of the second magnet 42 in the second extending direction, and one end portion of the third magnet 43 in the third extending direction easily becomes a flow that proceeds in the extending direction from the third magnet 43 toward the first magnet 41. Therefore, the flow of the magnetic flux passing through one end portion of the first magnet 41 in the first extending direction, one end portion of the second magnet 42 in the second extending direction, and one end portion of the third magnet 43 in the third extending direction is easily brought close to the flow of the magnetic flux along the extending direction indicated by the arrow FB. Therefore, the flow of the magnetic flux radiated from the magnet 40 can be easily brought close to the flow of the magnetic flux that generates reluctance torque. As a result, the magnetic flux radiated from the magnet 40 can suitably flow between the rotor 10 and the stator 3, and can be easily used to generate magnet torque. Therefore, the magnet torque can be suitably improved. Therefore, the torque of the motor 1 can be suitably improved.

For example, in a case where the first angle θ1, the second angle θ2, and the third angle θ3 have a relationship opposite to that in the present example embodiment, that is, a relationship of θ1<θ2<θ3 is satisfied, the end portion of the second magnet is easily disposed at a position farther from the outer peripheral surface of the rotor core in the extending direction than the end portion of the first magnet, and the end portion of the third magnet is easily disposed at a position farther from the outer peripheral surface of the rotor core in the extending direction than the end portion of the second magnet. Therefore, the flow of the magnetic flux passing through one end portion of the first magnet in the first extending direction, one end portion of the second magnet in the second extending direction, and one end portion of the third magnet in the third extending direction easily approaches the flow of the magnetic flux indicated by the arrow MB in FIG. 4. As a result, the flow of the magnetic flux radiated from the magnet is easily greatly different from the flow of the magnetic flux that causes reluctance torque. Therefore, it is difficult to sufficiently improve the magnet torque, and the torque of the motor cannot be sufficiently improved.

For example, when the magnet is provided in the entire slit, both end portions in the extending direction of the magnet are located at the radially outer edge of the rotor core. In this case, both end portions of the magnet in the extending direction are easily demagnetized due to an influence of a magnetic field generated by the stator or the like. Therefore, even if both end portions of the magnet in the extending direction are scraped to provide the flux barrier portion, the total amount of the magnetic flux radiated from the magnet is hardly affected. Thus, as in the present example embodiment, even if the magnets 40 are not provided in both end portions of the slit 30 in the extending direction, the total amount of the magnetic flux radiated from the magnets 40 is suppressed from being reduced. According to the present example embodiment, the magnet 40 can be made smaller than a case where the magnet 40 is provided in the entire slit 30. Therefore, the cost for preparing the magnet 40 can be reduced, and the manufacturing cost of the rotor 10 and the manufacturing cost of the motor 1 can be reduced.

According to the present example embodiment, both end portions of the first slit 31, both end portions of the second slit 32, and both end portions of the third slit 33 are located at the radially outer edge of the rotor core 20. Therefore, a portion of the rotor core 20 located between the plurality of slits 30 can extend in an arc shape from a part of the radially outer edge of the rotor core 20 to another part of the radially outer edge of the rotor core 20. As a result, the magnetic flux flowing between the stator 3 and the rotor 10 can suitably flow along between the plurality of slits 30 in the rotor core 20. Therefore, the reluctance torque can be further improved. Therefore, the torque of the motor 1 can be further improved.

According to the present example embodiment, the radial positions of both end portions of the first slit 31, the radial positions of both end portions of the second slit 32, and the radial positions of both end portions of the third slit 33 are the same. Therefore, the magnetic flux can stably flow between the plurality of slits 30 in the rotor core 20 as compared with the case where the radial positions of both end portions of each slit 30 vary. As a result, the reluctance torque can be further improved. Accordingly, the torque of the motor 1 can be further improved.

According to the present example embodiment, a plurality of the first slits 31, a plurality of the second slits 32, and a plurality of the third slits 33 are provided along the circumferential direction. The first magnet 41 is provided for each of the first slits 31. The second magnet 42 is provided for each of the second slits 32. The third magnet 43 is provided for each third slit 33. Therefore, the reluctance torque and the magnet torque can be further improved. As a result, the torque of the motor 1 can be further improved.

According to the present example embodiment, the first slit 31, the second slit 32, and the third slit 33 are disposed side by side at equal intervals in the radial direction. Therefore, the ease of flow of the magnetic flux between the first slit 31 and the second slit 32 in the rotor core 20 and the ease of flow of the magnetic flux between the second slit 32 and the third slit 33 in the rotor core 20 can be made approximately the same. As a result, the magnetic flux can be suitably made to flow between the plurality of slits 30 in the rotor core 20, and the reluctance torque can be more easily improved. Accordingly, the torque of the motor 1 can be further improved.

According to the present example embodiment, the first angle θ1 is larger than twice the third angle θ3 and smaller than three times the third angle θ3. By making the first angle θ1 larger than twice the third angle θ3, the first flux barrier portion 51 can be suitably enlarged, and the magnetic flux radiated from both end portions of the first magnet 41 can be further suppressed from returning to the first magnet 41 without passing through the stator 3. As a result, the magnet torque can be further improved. By making the first angle θ1 smaller than three times the third angle θ3, it is possible to suppress the dimension of the first magnet 41 in the first extending direction from becoming too small. As a result, the amount of magnetic flux radiated from the first magnet 41 can be suppressed from decreasing, and a decrease in magnet torque can be suppressed. As described above, the torque of the motor 1 can be more suitably improved.

According to the present example embodiment, the second angle θ2 is larger than 1.5 times the third angle θ3 and smaller than 2.5 times the third angle θ3. By making the second angle θ2 larger than 1.5 times the third angle θ3, the second flux barrier portion 52 can be suitably enlarged, and the magnetic flux radiated from both end portions of the second magnet 42 can be further suppressed from returning to the second magnet 42 without passing through the stator 3. As a result, the magnet torque can be further improved. By making the second angle θ2 smaller than 2.5 times the third angle θ3, it is possible to suppress the dimension of the second magnet 42 in the second extending direction from becoming too small. As a result, the amount of magnetic flux radiated from the second magnet 42 can be suppressed from decreasing, and the reduction in magnet torque can be suppressed. As described above, the torque of the motor 1 can be more suitably improved.

According to the present example embodiment, the magnet 40 is a ferrite magnet. Therefore, as compared with a case where the magnet 40 is a ferrite magnet, it is possible to suppress demagnetization of the magnet 40 due to the influence of temperature. Thus, the magnet torque can be suitably obtained. Therefore, the torque of the motor 1 can be more suitably improved.

The present disclosure is not limited to the above-described example embodiment, and other configurations may be adopted within the scope of the technical idea of the present disclosure. The plurality of slits may include other slits as long as the slits include at least one of a first slit, a second slit, and a third slit. The plurality of slits may include one or more other slits disposed side by side at intervals in the radial direction together with the first slit, the second slit, and the third slit. In this case, the other slits may have an arc shape that is convex radially inward as viewed in the axial direction. The plurality of slits may include slits that have not an arc shape as viewed in the axial direction. The plurality of slits may include slits in which no magnet is disposed. Only three slits of one first slit, one second slit, and one third slit may be provided.

The slit may not penetrate the rotor core in the axial direction. The slit may be opened only on one of the end surfaces on both sides in the axial direction of the rotor core. Both end portions of the slit in the extending direction may not be provided at the radially outer edge of the rotor core. The width of the first slit, the width of the second slit, and the width of the third slit may be different from each other. The dimension of the first slit in the first extending direction, the dimension of the second slit in the second extending direction, and the dimension of the third slit in the third extending direction may be the same.

The flux barrier portions provided in both end portions in the extending direction of the slit are not particularly limited as long as the flux barrier portions can suppress the flow of the magnetic flux. In the above-described example embodiment, the flux barrier portion is a void portion, but the flux barrier portion may be configured by embedding a non-magnetic material such as resin in the void portion.

The type of the magnet is not particularly limited. The magnet may be a neodymium magnet. When the slit includes another slit as described above, the plurality of magnets may include a magnet provided in the other slit. The first angle $\theta 1$, the second angle $\theta 2$, and the third angle $\theta 3$ are not particularly limited as long as a relationship of $\theta 1 > \theta 2 > \theta 3$ is satisfied. As described above, when another slit arranged in the radial direction together with the first slit, the second slit, and the third slit is provided, the positional relationship between both end portions of the other slit and both end portions of the magnet provided in the other slit may be determined along the relationship among the first angle $\theta 1$, the second angle $\theta 2$, and the third angle $\theta 3$.

Specifically, in the plurality of slits arranged in the radial direction and the magnet provided in each slit, the slit and the magnet located radially inward may be configured such that the angle formed by the line segment connecting the reference point and the end portion of the slit and the line segment connecting the reference point and the end portion of the magnet as viewed in the axial direction is larger. For example, when the fourth slit located to be separated radially inward of the third slit and the fourth magnet disposed in the fourth slit are provided, the fourth angle formed by the line segment connecting the reference point and the end portion of the fourth slit and the line segment connecting the reference point and the end portion of the fourth magnet may be smaller than the third angle as viewed in the axial direction. For example, in a case where the fifth slit located to be separated radially outward of the first slit and the fifth magnet disposed in the fifth slit are provided, the fifth angle formed by the line segment connecting the reference point and the end portion of the fifth slit and the line segment connecting the reference point and the end portion of the fifth magnet may be larger than the first angle as viewed in the axial direction.

The application of the motor to which the present disclosure is applied is not particularly limited. The motor may be mounted on, for example, a vehicle or a device other than the vehicle. The features described above in the present description may be appropriately combined as long as no conflict arises.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor that is provided in a motor and rotatable about a center axis, the rotor comprising:
  a rotor core including a plurality of slits; and
  a plurality of magnets provided in the plurality of slits; wherein
  the plurality of slits includes:
    an arc-shaped first slit that is convex radially inward as viewed in an axial direction;
    an arc-shaped second slit that is spaced radially inward of the first slit and is convex radially inward as viewed in the axial direction; and
    an arc-shaped third slit that is spaced radially inward of the second slit and is convex radially inward as viewed in the axial direction;
  the plurality of magnets include:
    an arc-shaped first magnet that is provided in the first slit and extends along the first slit as viewed in the axial direction;
    an arc-shaped second magnet that is provided in the second slit and extends along the second slit as viewed in the axial direction; and
    an arc-shaped third magnet that is provided in the third slit and extends along the third slit as viewed in the axial direction;
  two end portions of the first magnet are separated from two end portions of the first slit when viewed in the axial direction;
  two end portions of the second magnet are separated from two end portions of the second slit when viewed in the axial direction;
  two end portions of the third magnet are separated from two end portions of the third slit when viewed in the axial direction; and
  when a point at which an imaginary line passing through the center axis, the first slit, the second slit, and the third slit intersects an outer peripheral surface of the rotor core is set as a reference point when viewed in the axial direction:
    a first angle defined by a line segment connecting the reference point and an end portion of the first slit and a line segment connecting the reference point and an end portion of the first magnet is larger than a second angle defined by a line segment connecting the reference point and an end portion of the second slit and a line segment connecting the reference point and an end portion of the second magnet as viewed in an axial direction; and the second angle is larger than a third angle defined by a line segment connecting the reference point and an end portion of the third slit and a line segment connecting the reference point and an end portion of the third magnet as viewed in an axial direction.

2. The rotor according to claim 1, wherein the two end portions of the first slit, the two end portions of the second slit, and the two end portions of the third slit are located in a radially outer edge of the rotor core.

3. The rotor according to claim 1, wherein radial positions of the two end portions of the first slit, radial positions of the two end portions of the second slit, and radial positions of the two end portions of the third slit are the same as one another.

4. The rotor according to claim 1, wherein a plurality of the first slits, a plurality of the second slits, and a plurality of the third slits are provided along a circumferential direction;

the first magnet is provided for each of the first slits;

the second magnet is provided for each of the second slits; and the third magnet is provided for each of the third slits.

5. The rotor according to claim 1, wherein the first slit, the second slit, and the third slit are arranged side by side at equal intervals in a radial direction.

6. The rotor according to claim 1, wherein the first angle is larger than about twice the third angle, and smaller than about three times the third angle.

7. The rotor according to claim 1, wherein the second angle is larger than about 1.5 times the third angle, and smaller than about 2.5 times the third angle.

8. The rotor according to claim 1, wherein the magnet is a ferrite magnet.

9. A motor comprising:

the rotor according to claim 1; and a stator located on a radially outer side of the rotor.

* * * * *